US008041325B2

(12) United States Patent
Jonsson et al.

(10) Patent No.: US 8,041,325 B2
(45) Date of Patent: Oct. 18, 2011

(54) SPEED-BASED, HYBRID PARAMETRIC/NON-PARAMETRIC EQUALIZATION

(75) Inventors: Elias Jonsson, Malmö (SE); Douglas A. Cairns, Durham, NC (US); Kazuyoshi Uesaka, Kawasaki (JP); Hiroaki Watabe, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 778 days.

(21) Appl. No.: 12/107,623

(22) Filed: Apr. 22, 2008

(65) Prior Publication Data

US 2009/0149147 A1   Jun. 11, 2009

Related U.S. Application Data

(60) Provisional application No. 61/012,544, filed on Dec. 10, 2007.

(51) Int. Cl.
*H04B 1/10*   (2006.01)
(52) U.S. Cl. ........................ 455/296; 455/238.1; 375/148
(58) Field of Classification Search ................ 455/238.1, 455/296, 63.1, 67.13; 375/148
See application file for complete search history.

(56) References Cited

U.S. PATENT DOCUMENTS

| | | |
|---|---|---|
| 2005/0201447 A1 | 9/2005 | Cairns et al. |
| 2005/0215218 A1 | 9/2005 | Bottomley et al. |
| 2006/0268962 A1 | 11/2006 | Cairns et al. |
| 2008/0089395 A1 * | 4/2008 | Cairns .......................... 375/148 |

OTHER PUBLICATIONS

Johansson H et al., Robust Multiuser Detection in Unknown Noise Channels, Globecom '02. 2002—IEEE Global Telecommunications Conference. Conference Proceedings. Taipei, Taiwan, Nov. 11-17, 2002, New York, NY: IEEE, US, vol. 2, Nov. 17, 2002, pp. 1078-1082.
Kutz, G. et al. "Sparse Chip Equalizer for DS-CDMA Downlink Receivers." IEEE Communications Letters, vol. 9., No. 1, Jan. 2005, pp. 10-12.
Co-pending U.S. Appl. No. 60/942,921, filed Jun. 8, 2007.

* cited by examiner

*Primary Examiner* — Christian Hannon
(74) *Attorney, Agent, or Firm* — Coats & Bennett, P.L.L.C.

(57) ABSTRACT

A mobile receiver having a multi-mode interference suppression function and a way to estimate its speed utilizes a parametric approach to interference suppression at high speeds, and a nonparametric approach at low speeds. In particular, if the mobile receiver is currently operating in a nonparametric mode and its speed exceeds a first predetermined threshold, the mobile receiver switches to a parametric mode. Conversely, if the mobile receiver is currently in parametric mode and its speed is less than a second predetermined threshold, the mobile receiver switches to nonparametric mode. In one embodiment, the speed may be estimated by a Doppler frequency in the received signal, and the thresholds are Doppler frequencies. In one embodiment, the first and second thresholds are different, creating a hysteresis in the mode switching.

20 Claims, 3 Drawing Sheets

SPEED-BASED, HYBRID PARAMETRIC/NON-PARAMETRIC EQUALIZATION

This application claims priority to U.S. Provisional Application Ser. No. 61/012,544, titled Hybrid Parametric/Nonparametric Equalization, filed Dec. 10, 2007, and incorporated herein by reference in its entirety.

FIELD OF THE INVENTION

The present invention relates to wireless communication system mobile receivers, and in particular to a mobile Wideband Code Division Multiple Access (WCDMA) receiver that operates in parametric or nonparametric interference suppression mode in response to the mobile receiver's speed.

BACKGROUND

WCDMA signals experience interference in dispersive channels. This interference is a combination of self-interference, such as intersymbol interference; multiple access interference, i.e., interference due to non-zero code cross-correlation; interference from other cells in the downlink; or interference from other users in the uplink. This interference must be suppressed in order to achieve good throughput, in particular for High Speed Packet Access (HSPA) receivers. In addition, the enhanced throughput requirements set by 3GPP standardization for type 2 (single antenna terminal) and type 3 (dual antenna terminal) receivers cannot be met without interference suppression.

Linear methods for suppressing interference generally fall into the categories of chip level or symbol level equalization. Symbol level equalization follows the traditional Rake receiver architecture where the received chip-level data is despread at multiple delays, and then the multiple signal images are combined. Chip level equalization reverses the order of these operations. The received chip data is first combined using a linear filter and then despread at a single delay. These techniques are equivalent from a performance perspective, and the present invention applies to either equalization approach.

For symbol level equalization, one effective approach is the Generalized Rake receiver, or G-Rake. A G-Rake receiver calculates combining weights to perform both coherent combining of symbols despread at different delay values, as well as interference suppression by accounting for interference temporal and spatial correlations in the combining weight formulation. The combining weights are given by $$w = R_u^{-1} h$$

where $R_u$ is an impairment covariance matrix and $h$ is a vector of net channel coefficients. Here, the term "impairment" includes both interference and noise, while the term "net channel coefficient" refers to a channel coefficient that includes the effects of the transmit and receive filters as well as the fading wireless channel.

There are two general approaches to obtaining the impairment covariance matrix $R_u$ in a G-Rake receiver—nonparametric and parametric. Nonparametric method(s) are blind, and estimate $R_u$ directly from observed data. The parametric method assumes an underlying model, and computes $R_u$ from model parameters.

For chip equalization, the received signal at the chip level is given by $$r = Hc + v$$

where $r$ is a block of received chips, $H$ is a convolution matrix of chip or sub-chip spaced versions of the net channel coefficients, $v$ represents white Gaussian noise due to neighboring base stations and thermal noise, and $c$ is the transmitted chip sequence. The chip equalizer filter $f$ that suppresses the interference in (2) is the solution to $$f = A^{-1} b,$$

where $A$ is a correlation matrix of received pilot chips, and $b$ is a cross-correlation vector of received pilot chips with actual pilot chips.

Similar to G-Rake, there are two ways to generate the chip equalizer filter—a nonparametric form and a parametric form. These two forms differ primarily in how the A matrix is calculated. The nonparametric form uses the received chip data directly to calculate the A matrix. The parametric form works instead with the channel impulse response and the powers of the serving base station and the white Gaussian noise.

The existing parametric and nonparametric equalization approaches have different strengths and weaknesses. These are discussed with respect to the G-Rake receiver. The same strengths and weaknesses generally hold for chip equalization as well.

The strength of the parametric G-Rake approach is that performance (measured, e.g., by BER, BLER, or throughput) is relatively insensitive to the speed of the mobile receiver, such as a WCDMA user equipment (UE). The main weakness of the parametric approach is that it relies on channel information developed by the path searcher/delay estimator in the receiver. If this information is incorrect, then the effective color of the impairment will be incorrectly modeled. This mis-modeling degrades the performance of the G-Rake receiver.

The strength of the nonparametric approach is that it is a blind technique. There is no specific model for interference, so all interference is captured by the estimation approach. This blind approach is also indirectly a weakness. Blind approaches typically need a significant amount of "training" data to perform well. In a WCDMA system, the pilot channel has only 10 symbols per slot, so the pilot-based approach to covariance estimation requires significant smoothing (filtering) to work well. Smoothing limits the effectiveness of the approach to low UE speed.

Receivers employing either parametric or nonparametric techniques for channel equalization and interference suppression are thus optimal only under the circumstances for which the respective method generates the best results, and are suboptimal under other circumstances.

SUMMARY

According to one or more embodiments described herein, a mobile receiver having a multi-mode interference suppression function and a way to estimate its speed utilizes a parametric approach to interference suppression at high speeds, and a nonparametric approach at low speeds.

One embodiment relates to a method of receiving and decoding a wireless communication signal transmitted by an antenna, by a receiver operative to selectively switch between a parametric mode in which it uses a parametric approach to channel equalization and a nonparametric mode in which it uses a nonparametric approach to channel equalization. The wireless communication signal is received at a mobile receiver, and the speed of the receiver is estimated. If the receiver speed exceeds a first predetermined threshold and is operating in nonparametric mode, it switches to parametric mode. If the receiver speed is less than a second predetermined threshold and is operating in parametric mode, it switches to nonparametric mode. Interference is suppressed by performing channel equalization in the parametric or nonparametric mode, and the wireless communication signal is decoded after the interference suppression. In one embodiment, the speed may be estimated by a Doppler frequency in the received signal, and the thresholds are Doppler frequencies. In one embodiment, the first and second thresholds are equal. In an alternative embodiment they are different, creating a hysteresis in the mode switching.

Another embodiment relates to a wireless communication receiver. The receiver includes a receiver operative to receive a wireless communication signal; a speed estimation function operative to estimate the speed of the receiver; an interference suppression function operative in a nonparametric mode to suppress interference in the received wireless communication signal using a nonparametric approach to channel equalization, and further operative in a parametric mode to suppress interference in the received wireless communication signal using a parametric approach to channel equalization; and a controller operative to direct the interference suppression function into parametric mode if it is in nonparametric mode and the receiver speed exceeds a first predetermined threshold, and further operative to direct the interference suppression module into nonparametric mode if it is in parametric mode and the receiver speed is less than a second predetermined threshold.

DETAILED DESCRIPTION

Figure 1:
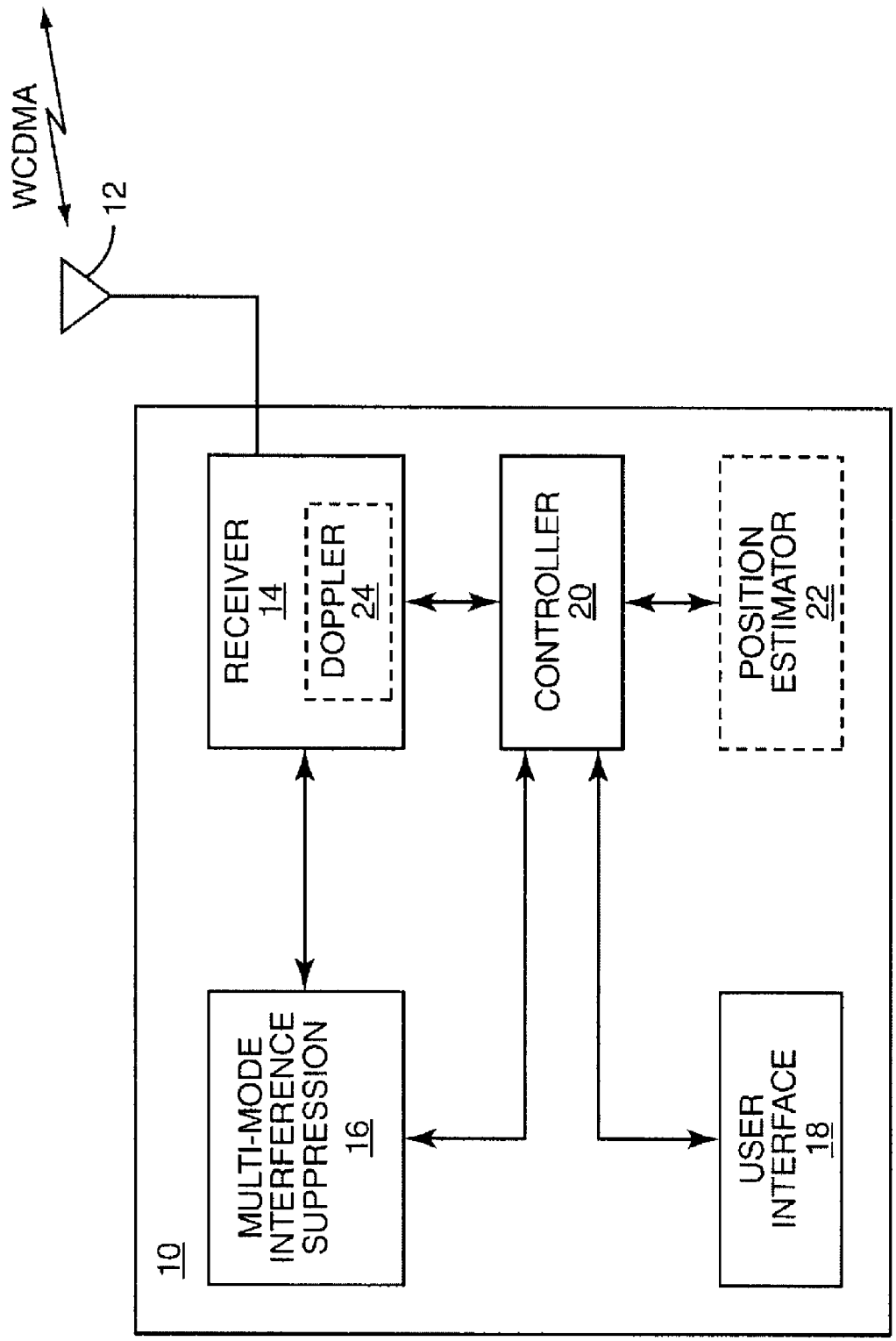
FIG. 1 is a functional block diagram of a mobile receiver having a multi-mode interference suppression function.

The detailed derivations of nonparametric and parametric approaches to both symbol level (G-Rake) and chip level (chip equalizer filter) interference suppression are presented below. As described above, the combining weights in a G-Rake receiver are given by $$w = R_u^{-1} h \quad (1)$$

There are two ways to obtain a nonparametric estimate of the impairment covariance matrix $R_u$. The first approach uses the pilot channel to estimate the slot-based quantities. This approach is described, in U.S. Pat. No. 6,363,104 entitled "Method and apparatus for interference cancellation in a Rake receiver" by G. Bottomley, which is incorporated herein by reference in its entirety. A slot-based estimate of the net channel coefficients and the impairment covariance matrix is given by $$\hat{h} = \frac{1}{N_p} \sum_{k=0}^{N_p-1} x_p(k) s^* \quad (2)$$

$$\hat{R}_{u,slot} = \frac{1}{N_p - 1} \sum_{k=0}^{N_p-1} \left( x_p(k) s^* - \hat{h} \right) \left( x_p(k) s^* - \hat{h} \right)^H,$$

where $N_p$ is the number of pilot symbols, $x_p$ is a vector of received, despread pilot symbols, s is a known transmitted pilot symbol, $\hat{h}$ is a vector of net channel coefficients, * denotes complex conjugate and H denotes Hermetian transpose. Using these quantities, the impairment covariance matrix can be obtained from $$R_u(n) = \lambda \hat{R}_u(n-1) + (1-\lambda) \hat{R}_{u,slot}, \quad (3)$$

where $\lambda$ is a filter coefficient and n is a slot index.

Another approach for generating a nonparametric estimate of the impairment covariance matrix involves the use of unoccupied traffic codes. The despread values for these codes contain impairment samples only. These impairment samples can be used to directly estimate $R_u$ as follows $$\hat{R}_u = \frac{1}{N_c N_T} \sum_{q=0}^{N_c-1} \sum_{k=0}^{N_T-1} x_{traffic}^q(k) (x_{traffic}^q(k))^H \quad (4)$$

where, $x_{traffic}^q(k)$ is a despread vector of traffic symbols for the $q^{th}$ unoccupied code during the $k^{th}$ symbol interval, $N_T$ is the number of symbols per code, and $N_c$ is the number of unoccupied codes.

The parametric approach for generating the impairment covariance matrix depends upon a model for the interference. This approach is described in U.S. patent application publication no. 2005/0201447, by D. Cairns, G. Bottomley, Y.-P. E. Wang, T. Fulghum, E. Jonsson, filed Mar. 12, 2004, and titled "Method and Apparatus for Parameter Estimation in a Generalized Rake Receiver," which is incorporated herein by reference in its entirety. The model depends upon the radio channel(s) between the UE and the modeled base station(s). Assuming a single serving base station and J interfering base stations, the model for the impairment covariance matrix is given by $$R_u = E_c(0) R_I^{own}(g_0) + \sum_{j=1}^{J} E_c(j) R_I^{other}(g_j) + N_0 R_n \quad (5)$$

where $$R_I^{own}(g_j; d_1, d_2) = \quad (6)$$

$$\sum_{\ell=0}^{L-1} \sum_{n=0}^{L-1} g_j(\ell) g_j^*(n) \sum_{\substack{m=-\infty \\ m \neq 0}}^{\infty} R_p(d_1 - mT_c - \tau_k(\ell)) R_p^*(d_2 - mT_c - \tau_k(n))$$

$$R_I^{other}(g_j; d_1 d_2) =$$

$$\sum_{\ell=0}^{L-1} \sum_{n=0}^{L-1} g_j(\ell) g_j^*(n) \sum_{m=-\infty}^{\infty} R_p(d_1 - mT_c - \tau_k(\ell)) R_p^*(d_2 - mT_c - \tau_k(n))$$

$$R_n(d_1, d_2) = R_p(d_1 - d_2)$$

Here, $E_c(j)$ is the total chip energy for base station j, $g_j$ is a vector of radio channel (medium) coefficients for the channel between the UE and the $j^{th}$ base station, $R_p(\theta)$ represents the convolution of the transmit and receive pulse shape filters evaluated at $\theta$, $\tau_j$ is a vector of L channel delays corresponding to the channel between the UE and the $j^{th}$ base station, $T_c$ is the chip time, and $d_k$ is the delay of the $k^{th}$ finger employed by the UE.

We now consider chip equalization. As described in a paper by G. Kutz and A. Chass, "Sparse Chip Equalizer for DS-CDMA Downlink Receivers", published in IEEE Communication Letters, vol. 9, no. 1, pp. 10-12, 2005, which is incorporated herein by reference in its entirety, the received signal at the chip level is, as presented above, $$r = Hc + v \quad (7)$$

where r is a N+L−1 block of received chips, H is the (N+L−1)×N sized Toeplitz convolution matrix whose columns are time shifted versions of the channel impulse response h with delay spread L (chip or sub-chip spaced version of the net channel coefficients), v represents white Gaussian noise due to neighboring base stations and thermal noise, and c is the transmitted chip sequence. The chip equalizer filter f that suppresses the interference in (7) is the solution to $$f = A^{-1}b \quad (8)$$

where
  $A = E\{X^H X\}$
  $b = E\{X^H C_p^H p\}$
  $X = C_p^H R$
  $C_p$ = N×S sized pilot scrambling and spreading matrix
  p = pilot chip sequence
and where A is a correlation matrix of the received pilot chips, b is a cross-correlation vector of received pilot chips with actual pilot chips, X is a matrix of received pilot chips, with columns that are time-shifted versions of the received pilot chips, R is a matrix if received data, with columns that are time-shifted versions of the received chip vector r, N is the size of the block of chips to process, S is the number of pilot symbols per data block, and $E\{X^H X\}$ denotes the expected value of $X^H X$.

The nonparametric approach to calculating the A matrix uses the received chip data directly $$A \approx \frac{1}{N+L-1} R^H R \quad (9)$$

In contrast, the parametric form works instead with the channel impulse response and the powers of the serving base station and the white Gaussian noise. The entries of the A matrix for the parametric form can be written as $$A(i, j) = I_{or} \sum_n h^*(n) h(n + \tau_i - \tau_j) + I_{oc} \delta(i - j) \quad (10)$$

where $\tau_k$ is the $k^{th}$ chip equalizer tap delay, $I_{or}$ is the serving base station power, and $I_{oc}$ is the white Gaussian noise power.

As discussed above, the parametric approaches to interference suppression—whether for symbol level or chip level estimation—are generally insensitive to receiver speed. These approaches give good performance with accurate channel delay information and knowledge of interfering sources (base stations in the downlink and high rate users in the uplink). However, this performance may be degraded in actual implementation due to computational constraints and/or errors in channel delay estimation. In contrast, the performance of nonparametric interference suppression, at either the symbol level or the chip level, is contingent upon receiver speed. However, nonparametric approaches tend to be more robust to implementation errors and may yield superior results.

According to embodiments of the present invention, a mobile receiver may be operable in both parametric and nonparametric interference suppression modes. The parametric mode is employed when the receiver is at high speeds since the filtering necessary for nonparametric estimation may not be able to track the changing interference due to the rapidly changing channel. The nonparametric mode is employed at low receiver speeds, when smoothing may be applied to capture the complete interference scenario.

Receiver speed may be determined in a variety of ways. Absolute speed may be obtained by comparing successive values from a position estimator, such as a GPS receiver, inertial navigation unit, or the like. Receiver speed may also be estimated from the Doppler shift of the received signal carrier frequency.

FIG. 1 depicts an exemplary mobile receiver 10. The receiver 10 includes one or more antenna(s) 12, receiver circuit 14, multi-mode interference suppression function 16, user interface 18, and optionally a position estimator 22, all under the control of a controller 20. The receiver circuit 14, which may comprise a transceiver in mobile User Equipment (UE) 10, receives a WCDMA signal at an antenna(s) 12, and amplifies and down-converts the received signal to baseband, as known in the art. The multi-mode interference suppression function 16 suppresses interference in the received signal in either parametric or nonparametric mode. The interference-suppressed signals are then decoded and further processed by other functional units (not shown). Decoded content is presented to the user interface 18, which includes control inputs such as a keypad, buttons, touchscreen, joystick, and the like, and transducers such as a display and/or speaker to render content for a user. In the case that the mobile receiver 10 is a duplex UE, the user interface 18 additionally includes input transducers such as a microphone, camera, and the like.

A controller 20 controls the overall operation of the receiver 10. The controller 20 may comprise a programmed microprocessor, Digital Signal Processor, or the like. In one embodiment, the receiver 10 includes a position estimator 22, such as a GPS receiver, inertial navigation unit, or the like. The position estimator 22 may receive, e.g., satellite position signals from the antenna(s) 12 or a separate antenna (not shown). In one embodiment, position estimator 22 may comprise a software routine executed by the controller 20, which estimates position by triangulation of signals from multiple base stations, measuring signal timing, or the like. As known in the art, the controller 20 may estimate the mobile receiver 10 speed by comparing successive position estimates from the position estimator 22. In another embodiment, the receiver circuit 14 includes a Doppler discrimination function 24, operative to detect and quantify a Doppler shift in the WCDMA carrier frequency. The Doppler frequency (assuming a stationary transmit antenna) is a function of the relative speed between the mobile receiver 10 and the transmit antenna.

In one embodiment, the Doppler frequency $f_D$ is estimated by a Doppler discrimination function 24 in the receiver circuit 14. The interference suppression function 16 operating mode is then selected by the controller 20 based on the current operating mode of the interference suppression function 16, the estimated Doppler frequency $f_D$, and at least one predetermined threshold Doppler frequency. In particular, If the interference suppression function 16 is currently operating in nonparametric mode and the estimated Doppler frequency is above one of the predetermined thresholds, for example $f_D > f_{high\text{-}speed}$, the controller 20 switches the interference suppression function 16 to parametric mode.

If the interference suppression function 16 is currently operating in parametric mode and the estimated Doppler frequency is below one of the predetermined thresholds, for example $f_D < f_{low-speed}$, the controller 20 switches the interference suppression function 16 to nonparametric mode.

Note that the predetermined switching thresholds $f_{low-speed}$ and $f_{high-speed}$ may be identical, but according to one embodiment of the invention these thresholds are not necessarily the same. This allows for some hysteresis so that the controller 20 is not constantly switching the interference suppression function 16 between parametric and nonparametric modes due to noise in the Doppler frequency estimate. According to an alternative embodiment, there may be several switching thresholds.

Figure 2:
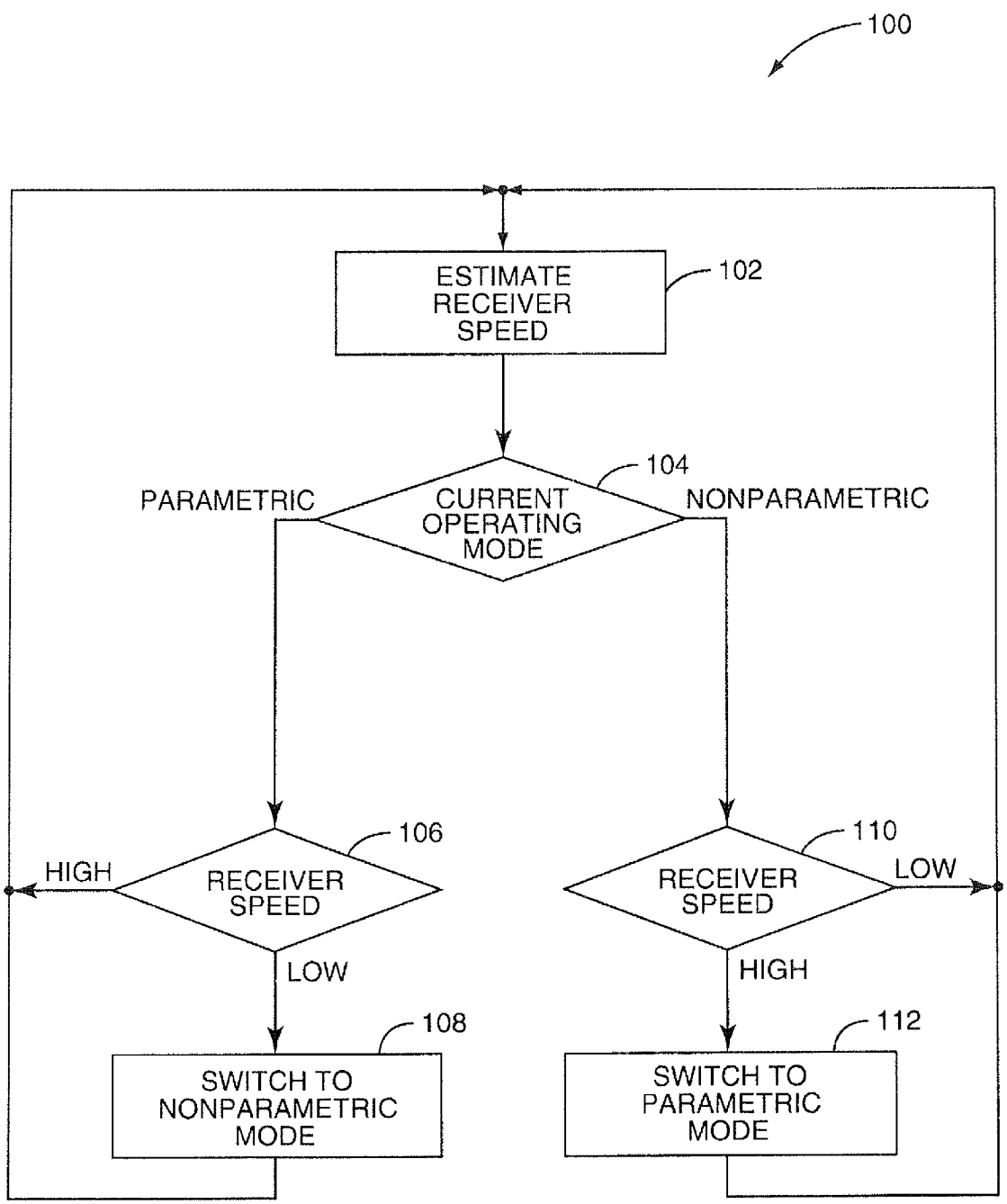
FIG. 2 is a flow diagram of a method of receiving and decoding a WCDMA signal.

A method 100 of receiving and decoding a WCDMA signal in a multi-mode mobile receiver 10 is depicted in FIG. 2. The controller 20 generates an estimate of the receiver 10 speed (block 102), either from a Doppler frequency estimator 24, a position estimator 22, or the like. If the mobile receiver 10 is currently operating in a parametric interference estimation mode (block 104) and the mobile receiver 10 speed is low (block 106) in relation to a predetermined threshold, it switches to a nonparametric interference estimation mode (block 108). If the mobile receiver 10 is currently in parametric mode (block 104) and the mobile receiver 10 speed is high (block 106) in relation to the same or a different predetermined threshold, it remains in parametric mode and continues to monitor the mobile receiver 10 speed (block 102).

If the mobile receiver 10 is currently operating in a nonparametric interference estimation mode (block 104) and the mobile receiver 10 speed is high (block 110) in relation to a predetermined threshold, it switches to a parametric interference estimation mode (block 112). If the mobile receiver 10 is currently in nonparametric mode (block 104) and the mobile receiver 10 speed is low (block 110), it remains in nonparametric mode and continues to monitor the mobile receiver 10 speed (block 102).

In one embodiment, when the interference suppression function 16 operates in nonparametric mode and the channel is flat, or non-dispersive, Rake finger placement is overridden, and a grid of fingers is centered on a reported delay for each receiver antenna 12. This allows the receiver to compensate for interference due to imperfect sampling. For example, if the delay searcher grid is too coarse, then the reported channel delay will be incorrect simply because of the coarseness of the delay searcher grid. This causes interference which must be addressed.

Figure 3:
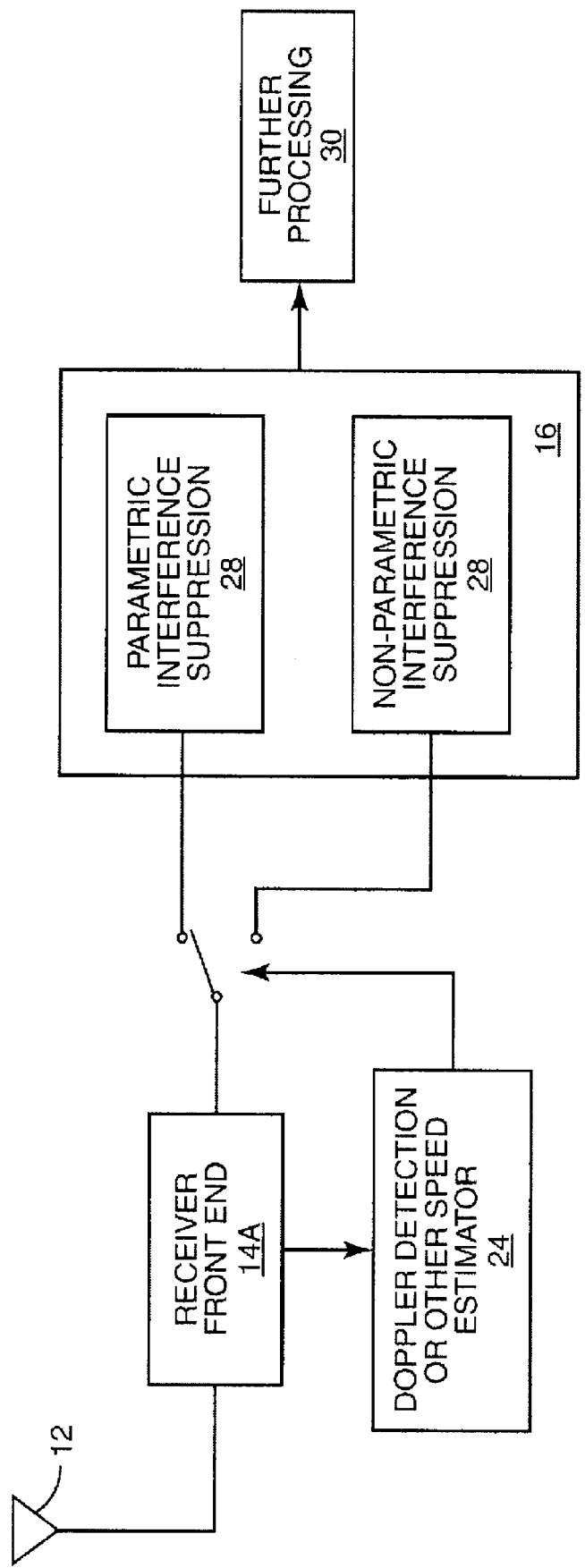
FIG. 3 is a functional block diagram of part of a mobile receiver, having parametric and non-parametric interference suppression functions.

FIG. 3 depicts a functional block diagram of part of the receiver circuit 14 and the multi-mode interference suppression function 16. WCDMA signals received at the antenna(s) 12 are amplified and processed by receiver front end circuits 14A. A Doppler detection function 24 (or, in some embodiments, a different speed estimator such as a position estimation circuit) estimates the speed of the mobile receiver 10. Based on the speed, the received signals are directed alternatively to a parametric interference suppression function 26 or a nonparametric interference suppression function 28. The interference-suppressed signal is then forwarded to other receiver circuits 30 for further processing.

The multi-mode interference suppression of the present invention presents numerous advantages over the prior art. For receivers that implement versions of parametric G-Rake that are sub-optimal, the present invention provides a performance boost at low receiver speeds. The increased performance is due to the suppression of all sources of interference. On the other hand, at medium to high receiver speeds, the present invention capitalizes on the robustness of the parametric G-Rake approach.

Published U.S. Patent Application No. 2005/0215218, assigned to the assignee of the present application, discloses in one embodiment a mobile station having a receiver including both a parametric impairment correlation estimator and a nonparametric impairment correlation estimator (see FIG. 5B; page 8, lines 8-26). Received signals are processed by both the parametric and nonparametric correlation estimators, and the output of one or the other is chosen for further processing, based on interference criteria. This application does not disclose or suggest selecting between parametric and nonparametric interference estimation and suppression based on the speed of the mobile receiver 10. Embodiments of the present invention calculate either parametric or nonparametric interference estimations in the alternative only. Accordingly, the mobile receiver 10 expends reduced computational effort, conserving battery power. Additionally, the speed-based selection is a simpler structure to implement.

Those of skill in the art will recognize that the multi-mode interference suppression function 16 may be implemented as dedicated hardware, such as part or all of an ASIC, FPGA, or the like. Alternatively, the multi-mode interference suppression function 16 may be implemented as one or more software modules executed on one or more stored-program microprocessors, Digital Signal Processors (DSP), or the like. In general, the multi-mode interference function 16 may be implemented in any combination of hardware, software, and firmware, as required or desired for a given application.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of receiving and decoding a wireless communication signal transmitted by an antenna, by a receiver operative to selectively switch between a parametric mode of operation, in which the receiver performs channel equalization based on one or more model parameters of an underlying model, and a nonparametric mode of operation, in which the receiver performs channel equalization based directly on one or more measured parameters, comprising:
   receiving the wireless communication signal at a mobile receiver;
   estimating the speed of the receiver;
   if the receiver speed exceeds a first predetermined threshold and is operating in nonparametric mode, switching to parametric mode;
   if the receiver speed is less than a second predetermined threshold and is operating in parametric mode, switching to nonparametric mode;
   suppressing interference by performing channel equalization in the parametric or nonparametric mode; and
   decoding the wireless communication signal after the interference suppression.

2. The method of claim 1 wherein the wireless communication signal comprises a Wideband Code Division Multiple Access (WCDMA) signal.

3. The method of claim 1 wherein the first and second predetermined thresholds are the same.

4. The method of claim 1 wherein the first and second predetermined thresholds are different.

5. The method of claim 1 wherein estimating the speed of the receiver relative to the transmitter comprises estimating a Doppler frequency $f_D$ of the received wireless communication signal.

6. The method of claim 5 wherein the first threshold is a frequency $f_{high\text{-}speed}$ and wherein if the receiver is operating in nonparametric mode, switching to parametric mode if $f_D > f_{high\text{-}speed}$.

7. The method of claim 5 wherein the second threshold is a frequency $f_{low\text{-}speed}$ and wherein if the receiver is operating in parametric mode, switching to nonparametric mode if $f_D < f_{low\text{-}speed}$.

8. The method of claim 1 wherein suppressing interference by performing channel equalization comprises suppressing interference by performing symbol level channel equalization in a Generalized Rake (G-Rake) receiver.

9. The method of claim 8 wherein performing symbol level channel equalization in the G-Rake receiver in nonparametric mode comprises using a pilot channel to estimate an impairment covariance matrix.

10. The method of claim 1 wherein suppressing interference by performing channel equalization comprises suppressing interference by performing chip level channel equalization in an interference suppression filter.

11. A wireless communication receiver, comprising:
a receiver operative to receive a wireless communication signal;
a speed estimation function operative to estimate the speed of the receiver;
an interference suppression function to suppress interference in the received wireless communication signal, and configured to operate in a nonparametric mode, in which the receiver performs channel equalization based directly on one or more measured parameters, and in a parametric mode, in which the receiver performs channel equalization based on one or more model parameters of an underlying model; and
a controller operative to direct the interference suppression function into parametric mode if it is in nonparametric mode and the receiver speed exceeds a first predetermined threshold, and further operative to direct the interference suppression module into nonparametric mode if it is in parametric mode and the receiver speed is less than a second predetermined threshold.

12. The receiver of claim 11 wherein the wireless communication signal comprises a Wideband Code Division Multiple Access (WCDMA) signal.

13. The receiver of claim 11 wherein the first and second predetermined thresholds are the same.

14. The receiver of claim 11 wherein the first and second predetermined thresholds are different.

15. The receiver of claim 11 wherein the speed estimation function comprises the receiver being further operative to estimate a Doppler frequency $f_D$ of the received wireless communication signal.

16. The receiver of claim 15 wherein the first threshold is a frequency $f_{high\text{-}speed}$ and wherein the controller is operative to direct the interference suppression function into parametric mode if it is in nonparametric mode and $f_D > f_{high\text{-}speed}$.

17. The receiver of claim 15 wherein the second threshold is a frequency $f_{low\text{-}speed}$ and wherein the controller is operative to direct the interference suppression function into nonparametric mode if it is in parametric mode and $f_D < f_{low\text{-}speed}$.

18. The receiver of claim 11 wherein the interference suppression function comprises a Generalized Rake (G-Rake) receiver operative to perform symbol level channel equalization.

19. The receiver of claim 18 wherein the G-Rake receiver performs symbol level channel equalization in nonparametric mode by using a pilot channel to estimate an impairment covariance matrix.

20. The receiver of claim 11 wherein the interference suppression function comprises an interference suppression filter operative to perform chip level channel equalization.

* * * * *

UNITED STATES PATENT AND TRADEMARK OFFICE
CERTIFICATE OF CORRECTION

PATENT NO. : 8,041,325 B2  Page 1 of 1
APPLICATION NO. : 12/107623
DATED : October 18, 2011
INVENTOR(S) : Jonsson et al.

It is certified that error appears in the above-identified patent and that said Letters Patent is hereby corrected as shown below:

In Fig. 3, Sheet 3 of 3, delete " 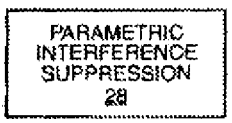 " and insert -- 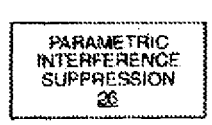 --, therefor.

In Column 1, Line 61, delete "$R_u$," and insert -- $R_u$ --, therefor.

In Column 5, Lines 5-6, delete "(N+L-1)xN)" and insert -- "((N+L-1)Xn) --, therefor.

Signed and Sealed this
Eighteenth Day of September, 2012

David J. Kappos
*Director of the United States Patent and Trademark Office*